United States Patent [19]

Sassi

[11] 4,166,575
[45] Sep. 4, 1979

[54] HOT AND COLD WATER SUPPLY FOR MIXING VALVES

[75] Inventor: Kari Sassi, Helsinki, Finland

[73] Assignee: Konejukka Oy, Finland

[21] Appl. No.: 798,389

[22] Filed: May 19, 1977

[30] Foreign Application Priority Data

Oct. 14, 1976 [FI] Finland ................... 762947

[51] Int. Cl.² ............................................. G05D 11/16
[52] U.S. Cl. ...................................... 236/12 R; 137/99
[58] Field of Search ................... 236/12 R; 137/90, 99

[56] References Cited

U.S. PATENT DOCUMENTS

| | | | |
|---|---|---|---|
| 2,609,146 | 9/1952 | Heikes | 236/12 |
| 2,657,860 | 11/1953 | Schmidt et al. | 236/12 |

*Primary Examiner*—William E. Wayner
*Attorney, Agent, or Firm*—Steinberg & Blake

[57] ABSTRACT

A system for supplying hot and cold water to a mixing valve includes hot and cold water conduits which extend in the same general direction and which are situated adjacent each other for respectively supplying hot and cold water to a mixing valve. A slide valve extends across and intersects both of these conduits to regulate the flow of water therethrough. The slide valve automatically assumes under given pressure and temperature conditions of the water in the hot and cold water conduits a given position with respect thereto, and the slide valve is capable of automatically responding to a change in the pressure conditions for automatically moving with respect to the hot and cold water conduits in a direction which tends to eliminate this change. A temperature-responsive structure is operatively connected with the slide valve for responding automatically to a change in the temperature conditions for tending to move the slide valve with respect to the hot and cold water conduits in a direction which will eliminate the change in the temperature conditions.

14 Claims, 2 Drawing Figures

HOT AND COLD WATER SUPPLY FOR MIXING VALVES

BACKGROUND OF THE INVENTION

The present invention relates to systems for supplying the hot and cold water to a mixing valve. Thus, the present invention relates to a system which includes a compensation member installed in the supply of hot and cold water to a mixing valve, such a compensation member including a slide member which serves as a pressure equalizer.

As is well known, with conventional mixing valves the ratio of the constriction of the cold and hot water flow ports, which determines the temperature, is selected so as to provide a desired temperature, for example, by turning an operating handle. On the other hand, the volume of water which flows, or in other words the rate of flow, can be regulated, for example, by rotating the same handle. In order to provide a temperature which will remain as constant as possible even though there are temperature variations in the water supply, compensator structures have been provided. Such compensator structures have thermostats which had a given length at their thermal elements corresponding to a given temperature, the thermal element being capable of changing the extent to which the supplied water is constricted within relatively wide proportions in response to temperature fluctuations. However, such conventional structures are exceedingly complex and expensive.

On the other hand, pressure changes in the cold or hot water conduits influence the temperatures of the water mixed together at a valve of the above type. Pressure equalizers of conventional structure have been utilized in order to counteract the effect of such pressure changes.

SUMMARY OF THE INVENTION

It is accordingly a primary object of the present invention to provide a structure which will avoid the above drawbacks.

Thus, it is an object of the present invention to provide a single unitary structure which is capable of equalizing both pressure and temperature variations, so that in this way it is possible to avoid the use of relatively expensive and complex units which are separately provided one for temperature regulation and the other for pressure regulation.

A more specific object of the present invention is to incorporate into a compensating slide valve which is capable of equalizing pressure a thermal structure which will also operate the same slide valve to equalize temperature, the thermal element of the structure of the invention being such that when the water flowing past the thermal element becomes warmer the thermal element tends to urge the slide valve in a direction which will reduce the proportion of hot water, and of course the reverse operation takes place when the water flowing past the thermal element becomes cooler.

It is thus to be understood that it is a primary object of the present invention to provide a new combination of elements capable of achieving pressure equalization and thermostatic action while at the same time particularly the temperature equalizer structure is provided in such a way that it will not only operate in a fully satisfactory manner but also will have a low cost.

According to the invention, in a system for supplying hot and cold water to a mixing valve, a hot water conduit means and a cold water conduit means extend in the same general direction and are situated adjacent each other for respectively supplying hot and cold water to a mixing valve. A slide valve means extends across and intersects both of these conduit means for regulating the flow of water through both of these conduit means, this slide valve means assuming automatically under given pressure the temperature conditions of the water in the hot and cold water conduit means a given position with respect thereto. The slide valve means is capable of responding automatically to a change in the pressure conditions for automatically moving with respect to the hot and cold water conduit means in a direction tending to eliminate this change. A temperature-responsive means is operatively connected with the slide valve means for responding automatically to a change in the temperature conditions for tending to move the slide valve means with respect to the hot and cold water conduit means in a direction which will eliminate the change in the temperature conditions.

BRIEF DESCRIPTION OF THE DRAWINGS

The invention is illustrated by way of example in the accompanying drawings which form part of this application and in which.

DESCRIPTION OF PREFERRED EMBODIMENTS

Figures 1, 2:
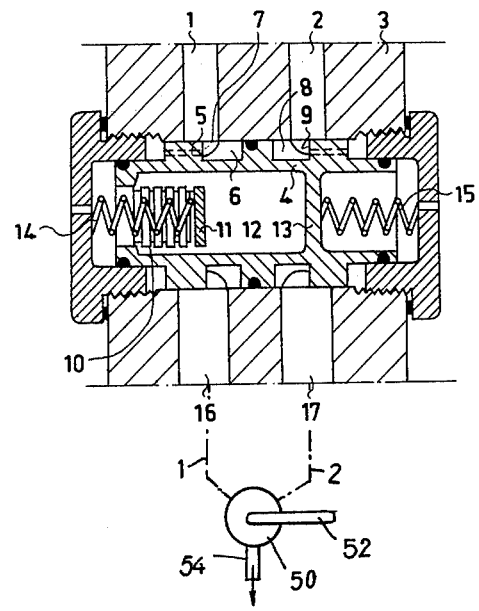
FIG. 1 is a fragmentary sectional elevation of one embodiment of a system of the invention shown in FIG. 1 in a schematic manner connected to a mixing valve.
FIG. 2 is a sectional elevation of another embodiment of a structure of the invention also shown schematically in FIG. 2 connected to a mixing valve.

Referring to FIG. 1, there is fragmentarily and schematically indicated therein, in section, a hot water conduit means 1 and a cold water conduit means 2. These conduit means are arranged so as to extend in the same general direction and are situated adjacent each other. In the illustrated example the conduit means 1 and 2 are in the form of bores formed in a valve body or housing structure 3. This structure 3 which in the illustrated example forms the hot water conduit means 1 and the cold water conduit means 2 supports the slide valve means 4 which extends across and intersects the conduit means 1 and 2. The slide valve means 4 is in the form of an elongated tubular body having an interior partition 13 extending across the tubular body while having at its exterior annular flanges which provide pressure and flow-controlling annular surfaces. Thus the intermediate annular flange carries a suitable sealing ring and cooperates with the portion of the body 3 situated between the conduits 1 and 2 in order to fluid-tightly and slidably guide the valve means 4 for movement perpendicularly across the conduits 1 and 2, the central axis of the slide valve means 4 being perpendicular to the conduits 1 and 2 while the several annular exterior surfaces at the flanges of the slide valve means 4 are all situated in planes normal to the central axis of the valve means 4. The pair of outer flanges of the valve means 4 are respectively formed with bores 5 passing therethrough, so that the water in the hot water conduit means 1 can have access through the left bore 5 to the left end surface of the left flange of FIG. 1 in order to urge the valve 4 to the right as viewed in FIG. 1, while the corresponding bore in the right flange enables the cold water from the cold water conduit means 2 to have access to the right surface of the right flange of FIG. 1 so as to tend to urge the slide valve means 4 toward the left, as viewed in FIG. 1. The central flange defines with the end flanges the annular grooves 6 and 8 which are indicated in FIG. 1. These grooves 6 and 8 are respectively defined in part by the annular flow-controlling surfaces 7 and 9 formed by the inner surfaces of the outer flanges. As is apparent from FIG. 1, a pair of hollow end cap members are threaded into the body 3 for fluid-tightly closing the transverse bore which receives the slide valve means 4 as well for fluid-tightly and slidably guiding the tubular end portions of the valve means 4 which extend beyond the outer flanges and which have suitable sealing rings where they slidably engage the inner cylindrical surfaces of the closure end caps illustrated in FIG. 1.

FIG. 1 schematically illustrates how the conduits 1 and 2 extend from the body 3 up to a mixing valve 50 which has an outlet 54 and an operating handle 52 which in a well known manner can be adjusted for determining both the temperature of the water issuing from the outlet 54 as well as the rate of flow thereof.

Assuming now that the handle 52 has been set so as to provide a predetermined rate of water flow at a predetermined temperature, and that with such a setting of the handle 52 there is for some reason a change in the pressure of the water in the hot water conduit means 1, so that this pressure increases, the result will be that the slide valve means 4 will automatically move to the right, in response to detection of the change in the pressure differential between the pressures of the water in the conduit means 1 and 2, and in this way the surface 7 of the left flange of the slide valve means will constrict the flow of hot water while at the same time the surface 9 of the right flange of FIG. 1 will permit a greater amount of cold water to flow through the cold water conduit means 2, so that in this way the previous pressure conditions of the hot and cold water are restored and the rate of flow from the outlet 54 of the valve 50 will be maintained even though there is a pressure fluctuation as described above. In other words, assuming that under equilibrium conditions after the handle 52 has been set there is a given pressure relationship between the water in the conduits 1 and 2, then if this pressure relationship is changed the slide valve means 4 will respond automatically to move in a direction which will tend to eliminate this change in the pressure differential between the water in the conduits 1 and 2, until the slide valve means 4 again assumes an equilibrium position.

The structure of the invention includes a temperature-responsive means which is operatively connected with the slide valve means 4 so as to respond to a change in the temperature conditions of the water in the conduits 1 and 2 in order to move the slide valve means 4 automatically in the direction which will tend to eliminate the change in the temperature conditions. For this purpose the hollow interior portion of the slide valve means 4 to the left of the partition 13 fluid-tightly carries an elongated flexible bellows 10 which has an open left end fluid-tightly fixed to the left end of the valve means 4, the bellows 10 extending into the hollow interior of the slide valve means 4 and terminating therein in an end plate 11 which forms that end of the bellows 10 which is nearest to the partition 13. Thus, the bellows 10 defines with the hollow interior of the slide valve means 4, at its portion to the left of the partition 13, an interior space which is closed off from the outer atmosphere, and this interior space is filled with a fluid 12 of the type which is conventionally used in thermostats and which will expand in response to an increase in temperature and contract in response to a decrease in temperature in a well known manner. Thus, the coefficient of thermal expansion of the fluid 12 is such that in response to an increase in temperature this fluid expands to cause the partition 13 and end plate 11 to move apart from each other whereas in response to a decrease in temperature the volume occupied by the fluid 12 will contract and the parts 11 and 13 will approach each other.

The slide valve means includes a spring means formed by the springs 14 and 15, the spring 14 being under compression between the left closure cap and the end plate 11, this spring 14 extending freely into the interior of the flexible bellows 10 in the manner illustrated in FIG. 1. The spring 15 is compressed between the partition 13 and the right closure cap. Thus, under the effect of the springs 14 and 15 the slide valve means 4 will tend to be centered. However, if for some reason the temperature of the hot water in the conduit means 1 increases, then the volume of the substance 12 will increase, and the parts 11 and 13 will move away from each other with the result that the surface 7 will in this case also constrict the flow of hot water through the hot water conduit means 1, the extent to which the surface 7 moves being one-half the distance by which the space between the end plate 11 and the partition 13 is increased. In other words the slide valve means moves by one-half the distance of the illustrated thermostat, and of course the result is that in this way the temperature is equalized. As is indicated in FIG. 1, the valve body 13 has the passages 16 and 17 which form parts of the conduit means 1 and 2, these passages 16 and 17 being connected by portions of the conduit means 1 and 2 to the mixing valve 50 as illustrated in FIG. 1. Thus after flowing through the passages 16 and 17 the hot and cold water reach the mixing valve 50.

It is possible by appropriate selection of the areas of the annular surfaces of the flanges of the slide valve means 4 as well as by appropriate selection of the spring forces of the springs 14 and 15 and by appropriate selection of the temperature-responsive means 10–13 to adapt the operation of the structure of the invention to the particular needs of a particular application.

Referring now to FIG. 2, the embodiment of the invention illustrated therein also includes a valve body 3 formed with the bores which provide the hot water conduit means 1 and the cold water conduit means 2 which have the passages 16 and 17 at the body 3 and which communicate with the mixing valve 50 in the manner shown in FIG. 2. However, it will be noted that with the embodiment of FIG. 2 the inlet parts of the pair of conduit means 1 and 2 are situated closer to each other than the outlet parts thereof which form the passages 16 and 17. The valve body 3 is of course formed with a transverse bore in which the slide valve means 4 of FIG. 2 is situated for sliding movement transversely across the pair of conduit means 1 and 2. With the embodiment of FIG. 2, instead of a single central flange provided with a groove to receive a sealing ring, the slide valve means 4 has a pair of intermediate flanges which are spaced from each other to define between themselves the space which receives the sealing ring 25 which with these intermediate flanges serve to slidably engage the transverse bore of the body 3 for slidably and fluid-tightly guiding the valve means 4 for movement transversely across the conduits 1 and 2. Thus it is this central flange structure which accommodates the sealing ring 25 which separates the hot and cold water sides of the structure from each other. Between the left intermediate flange and the left end flange 23 of the valve means 4, the latter has an annular groove 6 which receives the hot water present in the conduit means 1. In a corresponding way the right intermediate flange of the slide valve means 4 and an end flange 24 thereof define between themselves the annular groove 8 which receives the cold water.

The end flange 23 on the hot water side acts in the manner of a valve, and the same is true of the end flange 24 on the cold water side, these flanges 23 and 24 respectively having inner annular surfaces which face each other and which are adapted to act in the manner of valve members. As is apparent from FIG. 2 the valve body 3 is formed with enlarged spaces in which the flanges 23 and 24 are accommodated so that these flanges are free to move without any restriction or slidable engagement with any other components, thus avoiding any possible binding of the valve member. In the free spaces of the valve body 3 which accommodate the flanges 23 and 24, these flanges have outer end surfaces situated in the enlarged spaces 5 of the body 3 which respectively accommodate the flanges 23 and 24, and it is these outer surfaces of the flanges 23 and 24 against which the pressure of the hot and cold water acts to displace the valve means 4 in one direction or the other in accordance with changes in the pressure differential. Thus the hot water pressure acts on the left end surface of the flange 23 while the cold water pressure acts on the right end surface of the flange 24. In this way it is possible to achieve pressure equalization between the conduit means 1 and 2, and in particular between the passages 16 and 17 thereof.

With the embodiment of FIG. 2, the valve means 4 also includes a hollow tubular member defining a hollow interior space which accommodates the temperature-responsive means which in this case also includes the elongated flexible bellows 10 having a right closed end, as viewed in FIG. 2, defining with the right end wall of the valve means 4 of a hollow interior space in which the fluid 12 is accommodated so as to bring about expansion and contraction of the volume of the fluid 12 in accordance with temperature fluctuations as described above in connection with FIG. 1. The end closure plate of the bellows 10 situated at the right end thereof, as viewed in FIG. 2, bears against a member 36 which is slidable in a tubular portion of the valve means 4 which extends into the bellows 10, this tubular portion accommodating in its interior the spring 14 of the spring means. This spring 14 in turn presses at its left end against a member 35 which has an outer end pressing against a closure plate 32 which is threaded into a suitable bore at the left of the valve body 3, as viewed in FIG. 2. Between the threaded closure plate 32 and the flange 23, there is a circular member 26 having an outer peripheral groove receiving a sealing ring 28 and an inner peripheral groove receiving a sealing ring 29, this latter sealing ring together with the ring 26 surrounding and slidably engaging the tubular end sleeve portion of the valve means 4 which extends to the left beyond the flange 23 thereof. Thus the flange 23 includes an inner portion 34 which is integral with the sleeve portion which accommodates the member 35 and which is fluid-tightly and slidably guided by the ring 26 and the sealing ring 29.

On the cold water side there is also a tubular sleeve extension of the flange 24, this tubular sleeve extension being received in and slidably guided by a circular member 27 having an inner groove accommodating an inner sealing ring 31. This ring 27 also has an outer groove accommodating an outer sealing ring 30, and this ring 27 is situated against an annular closure ring 33 which is threaded into the body 3 at its right side, as viewed in FIG. 2. The ring 33 is formed with a central threaded bore into which a central closure cap 38 is threaded, and this closure cap 38 receives in its interior one end of the spring 37, the opposite end of which presses directly against a central portion of the flange 24, in the interior of the sleeve which extends beyond the flange 24 to be guided by the ring 27. Thus the spring 37 corresponds to the spring 15 of FIG. 1, while the spring 14 of FIG. 2 of course corresponds to the spring 14 of FIG. 1.

It will be noted that with the embodiment of FIG. 2, the valve body 3 has a pair of circular annular surface portions respectively situated in parallel planes normal to the central axis of the valve means 4 and respectively situated adjacent and facing the inner circular surfaces of the flanges 23 and 24, so that these surfaces of the body 3 form in effect structure equivalent to valve seats which cooperate with valve members formed by the flanges 23 and 24, so that these flanges define with the valve seat portions of the body 3 the constricted spaces 20 and 21 through which the hot and cold water must respectively flow in order to reach the outlet passages of the valve body 3. As a result of this feature it is possible to achieve reliable cold and hot water rates of flow and a reliable ratio between the hot and cold water flow without any possible risk of seizing of the throttling elements or other functional problems.

Considering the operation of the structure shown in FIG. 2, assuming that the structure initially has the position shown in FIG. 2 where the cross-sections of the constriction 20 and 21 are substantially equal so that the hot and cold water rates of flow are substantially equal and correspondingly the pressures in the flow passages 1, 16, and 2, 17 are substantially equal, then if, for example, the pressure increases in the hot water conduit means 1, the slide valve means 4 will automatically move in opposition to the spring 37 toward the right, as viewed in FIG. 2, so that the cross-section of flow at the constriction 20 is reduced while the cross-section of flow at the constriction 21 is increased, so that the pressure change is equalized at the outlet passages 16 and 17 and the flow rates will remain substantially unchanged.

Assuming, for example, that the valve 50 is set so that the hot water side is fully opened while the cold water side is fully closed, then there will be a sharp drop in pressure at the conduit means 1 while there will be a sharp rise in pressure at the conduit means 2, so that the slide valve means 4 under these conditions will automatically move to the left as viewed in FIG. 2. Because of the very substantial pressure differential which exists under these conditions between the water in the conduit means 1 and 2, and of course between the water in the passages 16 and 17, the pressure-responsive structure overrides the temperature-responsive means, so that even though the volume of the substance 12 increases, this increase is taken up only by compression of the spring 14 and the cross-section of flow at the constriction 20 still remains at its maximum size even though there is a substantial increase in temperature of the medium 12. Of course, the same considerations apply in the event that the cold water conduit means is fully opened while the hot water conduit means is fully closed. Thus it is clear that the compensating structure of the invention responds to pressure variations taking place both at the incoming as well as the outgoing parts of the conduit means. In other words while the slide valve means and temperature-responsive means will of course respond to pressure and temperature conditions existing upstream of the slide valve means, these units also respond to conditions downstream thereof resulting from the setting of the handle 52.

For example, if for some reason the temperature of the hot water increases, the medium 12 will of course expand and the inner end of the bellows will press against the intermediate member 36, transferring the pressure to the spring 14 and the member 35, with the result that the slide valve means 4 will move toward the right, reducing the cross-section of flow at the constriction 20 while providing a corresponding increase at the constriction 21. In this way the flow rate of hot water at the outgoing passage 16 decreases and that of the cold water at the outgoing passage 17 increases. In this manner compensation for temperature as well as pressure changes is provided before the water reaches the mixing valve 50.

Of course the invention is not to be narrowly confined to the details presented above merely by way of example, inasmuch as these details may vary within the inventive idea defined by the claims which follow.

What is claimed is:

1. In a system for supplying hot and cold liquid such as water to a mixing valve, hot water conduit means and cold water conduit means extending in the same general direction and situated adjacent each other for respectively supplying hot and cold water to a mixing valve, slide valve means extending across and intersecting both of said conduit means for regulating the flow of water through both of said conduit means, said slide valve means assuming automatically under given pressure and temperature conditions of the water in said hot and cold water conduit means a given position with respect thereto, and said slide valve means automatically responding to a change in the pressure conditions for automatically moving said slide valve means with respect to said hot and cold water conduit means in a direction tending to eliminate said change, and temperature-responsive means located within said slide valve means for sensing a change in the average temperature of said hot and cold water prior to mixing thereof and for responding automatically to a change in the temperature conditions of said hot or cold water and for moving said slide valve means with respect to said hot and cold water conduit means in a direction which will eliminate the change in the temperature conditions.

2. The combination of claim 1 and wherein said hot and cold water conduit means support said slide valve means for movement transversely with respect to said hot and cold water conduit means, and said slide valve means including a spring means tending to maintain said slide valve means in a given central position with respect to said hot and cold water conduit means, said temperature-responsive means including a hollow interior portion of said slide valve means and a flexible bellows situated in the hollow interior portion of said slide valve means and defining with said hollow interior portion an interior space for housing a temperature-responsive fluid which expands in response to an increase in temperature and contracts in response to a decrease in temperature, said spring means cooperating with said slide valve means and bellows for providing for said slide valve means an automatic movement in the direction decreasing the flow through said hot water conduit means and increasing the flow through said cold water conduit means when the fluid in said interior space expands and increasing the flow through said hot water conduit means and decreasing the flow through said cold water conduit means when the latter fluid contracts.

3. The combination of claim 2 and wherein said slide valve means has exterior annular surfaces forming pressure surfaces acted upon by the water in both of said conduit means for responding to a change in the pressure differential of the water in both of said conduit means for causing automatic movement of said slide valve means in a direction tending to eliminate said change while said slide valve means also has annular exterior flow-controlling surfaces which in response to movement of said slide valve means cooperate with said hot and cold water conduit means for regulating the rate of flow of water therethrough.

4. The combination of claim 3 and wherein said slide valve means has a pair of end flanges which respectively have directed toward each other the annular surfaces which control the flow of water through said hot and cold water conduit means, the latter conduit means having a pair of annular surfaces respectively situated between and facing said end flanges and situated respectively in the path of flow of water in both of said conduit means, so that said flanges move with respect to said surfaces of said conduit means for regulating the flow therethrough.

5. The combination of claim 4 and wherein said slide valve means has an axis extending perpendicularly across said hot and cold water conduit means while said annular surfaces are all situated in planes normal to said axis of said slide valve means.

6. The combination of claim 5 and wherein said slide valve means includes beyond said flanges a pair of elongated sleeve portions and said hot and cold water conduit means carrying a guide means fluid-tightly engaging said sleeve portions for guiding said slide valve means for movement along said axis thereof.

7. The combination of claim 6 and wherein said sleeve portions are hollow, said spring means including one spring situated in one of said sleeve portions and engaging said slide valve means as well as a member fixed to said conduit means while in the other sleeve portion there is a fixed member and said spring means including a spring extending from said fixed member toward an end of said bellows, an additional member being situated between said bellows and the latter spring.

8. The combination of claim 1 and wherein said slide valve means has exterior annular pressure surfaces to be acted upon by the water in said hot and cold water conduit means for determining the position of said slide valve means in accordance with the pressure of the water in said hot and cold water conduit means.

9. In a system for supplying hot and cold water to a mixing valve, hot water conduit means and cold water conduit means extending in the same general direction and situated adjacent each other for respectively supplying hot and cold water to a mixing valve, slide valve means extending across and intersecting both of said conduit means for regulating the flow of water through both of said conduit means, said hot and cold water conduit means supporting said slide valve means for movement transversely with respect to said hot and cold water conduit means, said slide valve means assuming automatically under given pressure and temperature conditions of the water in said hot and cold water conduit means a given position with respect thereto, and said slide valve means automatically responding to a change in the pressure conditions for automatically moving with respect to said hot and cold water conduit means in a direction tending to eliminate said change, and temperature-responsive means operatively connected with said slide valve means for responding automatically to a change in the temperature conditions for tending to move said slide valve means with respect to said hot and cold water conduit means in a direction which will eliminate the change in the temperature conditions, and said slide valve means including a spring means tending to maintain said slide valve means in a given central position with respect to said hot and cold water conduit means, said temperature-responsive means including a hollow interior portion of said slide valve means and a flexible bellows situated in the hollow interior portion of said slide valve means and defining with said hollow interior portion an interior space for housing a temperature-responsive fluid which expands in response to an increase in temperature and contracts in response to a decrease in temperature, said spring means cooperating with said slide valve means and bellows for providing for said slide valve means an automatic movement in the direction decreasing the flow through said hot water conduit means and increasing the flow through said cold water conduit means when the fluid in said interior space expands and increasing the flow through said hot water conduit means and decreasing the flow through said cold water conduit means when the latter fluid contracts.

10. The combination of claim 9 and wherein said slide valve means has exterior annular surfaces forming pressure surfaces acted upon by the water in both of said conduit means for responding to a change in the pressure differential of the water in both of said conduit means for causing automatic movement of said slide valve means in a direction tending to eliminate said change, while said slide valve means also has annular exterior flow-controlling surfaces which in response to movement of said slide valve means cooperate with said hot and cold water conduit means for regulating the rate of flow of water therethrough.

11. The combination of claim 10 and wherein said slide valve means has a pair of end flanges which respectively have directed toward each other the annular surfaces which control the flow of water through said hot and cold water conduit means, the latter conduit means having a pair of annular surfaces respectively situated between and facing said end flanges and situated respectively in the path of flow of water in both of said conduit means, so that said flanges move with respect to said surfaces of said conduit means for regulating the flow therethrough.

12. The combination of claim 11 and wherein said slide valve means has an axis extending perpendicularly across said hot and cold water conduit means while said annular surfaces are all situated in planes normal to said axis of said slide valve means.

13. The combination of claim 12 and wherein said slide valve means includes beyond said flanges a pair of elongated sleeve portions and said hot and cold water conduit means carrying a guide means fluid-tightly engaging said sleeve portions for guiding said slide valve means for movement along said axis thereof.

14. The combination of claim 13 and wherein said sleeve portions are hollow, said spring means including one spring situated in one of said sleeve portions and engaging said slide valve means as well as a member fixed to said conduit means while in the other sleeve portion there is a fixed member and said spring means including a spring extending from said fixed member toward an end of said bellows, an additional member being situated between said bellows and the latter spring.

* * * * *